Aug. 6, 1963  P. J. VERNEUIL  3,099,889
FISHING LINE GUIDE
Filed Feb. 2, 1960
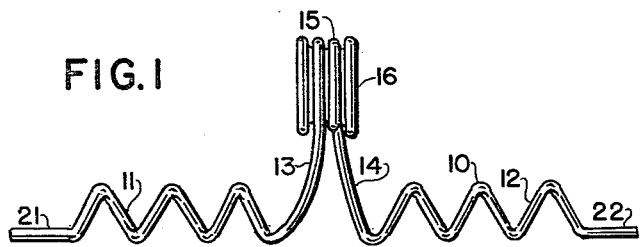
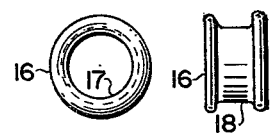
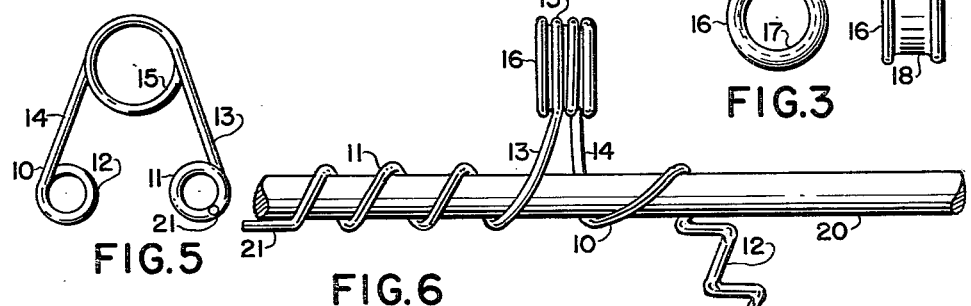
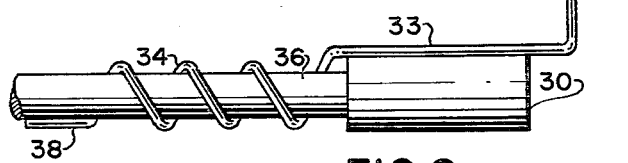
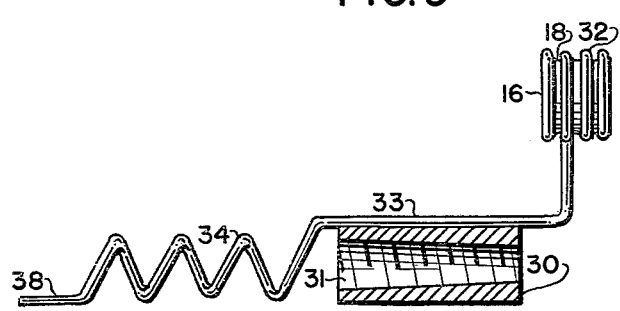
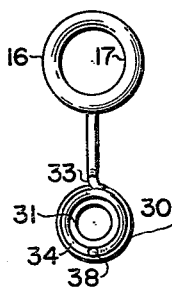
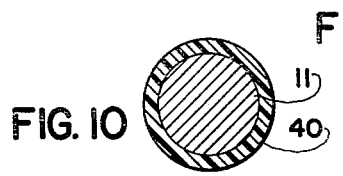
INVENTOR.
Pierre J. Verneuil
BY *Bradley Cohn*
ATTORNEY United States Patent Office 3,099,889
Patented Aug. 6, 1963

3,099,889
FISHING LINE GUIDE
Pierre J. Verneuil, 10 Carleton Ave., Mount Vernon, N.Y.
Filed Feb. 2, 1960, Ser. No. 6,251
3 Claims. (Cl. 43—24)

This invention relates in general to line guides for fishing rods and, more particularly, to easily attached line guides.

Often conventional line guides are broken from a rod while it is being used and a fisherman with otherwise complete tackle and equipment is left unable to fish. An expensive fishing trip can thus be a complete loss until a professional repair is effected.

It is therefore an object of this invention to provide a line guide for fishing rods which can be rapidly fixed to a rod in the field without any special skills, tools or equipment.

A further object of this invention is to provide a line guide replacement which can be securely fixed to a rod.

Another object of this invention is to provide a line guide replacement which can be secured at any point along the length of a rod where it is needed.

An additional object of this invention is to provide a fishing rod tip line guide which may be securely and quickly fixed to the end of a broken fishing rod.

Additional objects, advantages and features of invention reside in the construction and arrangement of the parts involved in the embodiments of the invention and its practice as will be understood from the following description and the accompanying drawing wherein:

FIG. 1 is a side view of a line guide;
FIG. 2 is an end view of the line guide with the eyelet removed;
FIG. 3 is an end view of the eyelet;
FIG. 4 is a side view of the eyelet;
FIG. 5 is an end view of the line guide flexed for the insertion of an eyelet;
FIG. 6 is a side view of a fragment of a fishing rod with a line guide partially fastened to it;
FIG. 7 is a side view of a fishing rod tip line guide with its cylindrical screw member shown in section;
FIG. 8 is an end view from the rear of the fishing rod tip line guide;
FIG. 9 is a side view of a fishing rod tip line guide shown fixed in position on the end of a fragment of a rod; and
FIG. 10 is a sectional view of a coated wire.

Referring to the drawings in detail, FIGS. 1, 2, 5 and 6 show how a single piece of spring wire 10 is formed into a line guide. The ends of the wire 10 are formed into the two helices 11 and 12 which are spirals with a high slope. The helices 11 and 12 are turned in the same hand or direction. Between these two helices, the wire 10 extends upward to form the arms 13 and 14 and the two turn loop 15.

A line guide eyelet 16 contains a smoothly flaring central passage 17 through which a fishing line may pass with a minimum of friction and wear. A wide circumferential groove 18 extends about the eyelet. If the arms 13 and 14 are flexed apart as shown in FIG. 5, the loop 15 will be expanded so that the eyelet 16 may be placed within it. Upon the release of the arms 13 and 14, the loop will spring back to seat in the groove 18 and thus hold the eyelet. This particular structure allows the eyelet, which may be of agate, plastic, or any other suitable material, to be rapidly and easily replaced or changed when desired.

As may be seen in FIG. 6, the line guide may be fixed without tools anywhere along the length of a rod without having to slip it over one end of the rod. This is a very desirable feature when the line guide is used as a repair replacement as other line guides on either side of the replacement need not be removed to effect the repair. The line guide is merely positioned along the rod 20 and each helix or spiral 11 and 12 is merely twisted about the rod 20. In a like manner, should it be desired, the line guide can be just as easily removed from a rod. To allow the twisting of the spirals about a rod, the line guides should be made in graduated sizes so that the diameters of the helices are slightly less than than part of the rod about which they are to be wound. Also the slope of the helices should be quite steep so that the adjacent turns of each helix are at least almost as far apart as the diameter of the rod they are to be wrapped about. This allows the spring wire 10 to be wrapped about a rod 20 without exceeding its elastic limit to such an extent that the helices will not grip the rod.

Since these helices 11 and 12 are wound in the same direction, a clockwise torque exerted on the eyelet will tighten one helix from its centrally disposed end to resist this torque while a counter clockwise torque will tighten the other helix in a like manner to resist this other torque. Therefore, each helix works in the same manner as a spring ratchet to resist torque in one direction or another. For the same reason, a longitudinal force acting along the rod on the line guide will tighten the helix extending in the direction from which the force is applied to prevent any movement of the line guide along the rod. For these reasons, this line guide construction results in a self locking feature which tends to keep the line guide in position on a rod.

To assist the helices 11 and 12 in gripping the rod 20, to help prevent corrosion, and to enhance the looks of the line guide assembly, the helices may be coated with a suitable rubber or plastic coating or "spaghetti" covering or the like as illustrated by 40 in FIG. 10. A soft coating of this nature will also serve to prevent the finish of the rod 20 from being scratched or otherwise marred by direct contact with the wire 10. The arms 13 and 14 and the loop 15 may be plated to resist corrosion and enhance appearance, or they may also be covered with a plastic coating. The longitudinal tips 21 and 22, which extend outward from the tips of the helices, are easy to grasp to wind or unwind the helices from a rod. They may also be used to additionally secure a line guide to a rod by passing a length of tape or a few turns of line about the rod and the tips.

The rod tip line guide, shown in FIGS. 7–9, consists of a cylindrical member 30 containing a longitudinal tapered channel having the internal cutting or self-tapping threads 31 formed in it. A spring wire 33 is fixed along the cylinder 30 by soldering, brazing, or the like. The forwardly disposed end of this wire 33 extends upwards for a short distance and is then formed into a coil 32 to grasp the eyelet 16 in its peripheral groove 18. The rearwardly disposed end of the wire 33 is formed into a high slope helix 34 having a common axis with the taper in the cylinder 30. If the self-tapping threads 31 are right hand threads, the helix 34 will have a right hand twist. The diameter of the helix 34 should be slightly less than the diameter of the rod about which it is to be wound.

The rod tip line guide is installed by flexing the helix 34 aside and then screwing the cylinder over the tip of the rod. Even if the tip of a rod is broken off, the tapered self-cutting threads 31 will accommodate the diameter of the rod at the break. When the cylinder is firmly screwed in place and the coil 32 is extending in the desired direction, the helix 34 is wound about the rod 36 as shown in FIG. 9. If the internal threads 31 are right hand, the tightening of the cylinder 30 will prevent any torque in this direction from rotating the cylinder to the right. If a torque is exerted to the left, the spring wire helix 34 will tighten about the rod 36 to grip it and prevent any rotation in that direction. The longitudinal tip 38 extending from the helix 34 may be used to grasp the helix when wrapping it around the rod 36 or it may be used to further secure the rod tip line guide by binding it to the rod with a length of tape, line, or the like. The helix 34 may also be coated to help the helix grip the rod and to protect the finish of the rod.

These line guides are not only easily used replacements which may be fixed to any rod without the use of tools, but they may also be sold on rods completely equipped with these line guides. This would result in considerable labor saving in the assembly of the rods over conventional line guides. In addition, kits of assorted rods and guides may be provided so that a fisherman could assemble a given rod with a selected combination of guides.

I claim:

1. A fishing rod tip line guide comprising a tip member having a tapered internal self-cutting thread, a closed loop of wire extending forwardly from and to one side of said tip member, and a helix of steep slope of spring wire extending backward from said tip member and adapted to be wrapped about a fishing rod in the same direction as the internal threads in said tip member to lightly grip a rod so that a torque tending to unscrew said tip member from said rod will tighten said helix to grip the rod.

2. The combination according to claim 1 with the addition of an eyelet secured by said loop of wire.

3. The combination according to claim 2 wherein said helix is coated with a soft plastic material.

References Cited in the file of this patent

UNITED STATES PATENTS

| | | |
|---|---|---|
| 2,230,611 | Coffin et al. | Feb. 4, 1941 |
| 2,561,675 | Ross | July 24, 1951 |
| 2,573,647 | Marke | Oct. 30, 1951 |
| 2,596,835 | Benge | May 13, 1952 |

FOREIGN PATENTS

| | | |
|---|---|---|
| 1,100,127 | France | Mar. 30, 1955 |
| 12,828 | Great Britain | of 1902 |
| 490,935 | Great Britain | Aug. 23, 1938 |
| 536,519 | Great Britain | May 16, 1941 |